United States Patent
Okamoto

(10) Patent No.: US 11,761,533 B2
(45) Date of Patent: Sep. 19, 2023

(54) AUTOMATIC TRANSMISSION AND WARMING-UP METHOD FOR AUTOMATIC TRANSMISSION

(71) Applicant: ISUZU MOTORS LIMITED, Tokyo (JP)

(72) Inventor: Takefumi Okamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 62 days.

(21) Appl. No.: 17/442,600

(22) PCT Filed: Mar. 24, 2020

(86) PCT No.: PCT/JP2020/013002
§ 371 (c)(1),
(2) Date: Sep. 23, 2021

(87) PCT Pub. No.: WO2020/196514
PCT Pub. Date: Oct. 1, 2020

(65) Prior Publication Data
US 2022/0170542 A1    Jun. 2, 2022

(30) Foreign Application Priority Data

Mar. 25, 2019  (JP) ................. 2019-057117

(51) Int. Cl.
*F16H 61/02* (2006.01)
*F16H 3/38* (2006.01)
*F16H 63/46* (2006.01)

(52) U.S. Cl.
CPC .......... *F16H 61/0213* (2013.01); *F16H 3/38* (2013.01); *F16H 63/46* (2013.01); *F16H 2061/0232* (2013.01)

(58) Field of Classification Search
CPC ........ F16H 3/38; F16H 61/0213; F16H 63/46; F16H 2061/0241
See application file for complete search history.

(56) References Cited

U.S. PATENT DOCUMENTS 5,803,863 A * 9/1998 Hayward ............ F16H 57/0413
475/117
6,440,039 B1 * 8/2002 Warren ............... F16H 57/0413
477/76

(Continued)

FOREIGN PATENT DOCUMENTS

| CN | 101392803 A | 3/2009 |
| JP | 62-104049 U | 7/1987 |

(Continued)

OTHER PUBLICATIONS

International Search Report from International Application No. PCT/JP2020/013002, dated Jun. 30, 2020.

*Primary Examiner* — Edwin A Young
(74) *Attorney, Agent, or Firm* — Shih IP Law Group, PLLC

(57) ABSTRACT

An automatic transmission of the present invention is provided with: a plurality of rotating shafts; a plurality of gears; a plurality of synchronizing mechanisms including an output-side synchronizing mechanism; a lubricating oil storage part that stores a lubricating oil which is drawn upward by rotation of the gears; a shift position detection unit that detects which of a plurality of shift positions, including a neutral position, has been selected; and a control unit which, if the neutral position has been detected by the shift position detection unit, causes a synchronizing mechanism other than the output-side synchronizing mechanism to operate, and brings a clutch into a connected state after coupling a rotating shaft other than an output shaft and a gear other than an output-side gear.

6 Claims, 9 Drawing Sheets

(56) References Cited

U.S. PATENT DOCUMENTS

| | | | |
|---|---|---|---|
| 7,846,061 B2 * | 12/2010 | Steinborn | B60W 30/194 |
| | | | 184/6.12 |
| 2002/0033059 A1 * | 3/2002 | Pels | B60K 6/36 |
| | | | 903/905 |
| 2010/0319486 A1 | 12/2010 | Kawamoto | |
| 2012/0247903 A1 | 10/2012 | Pritchard | |
| 2015/0051802 A1 * | 2/2015 | Saitoh | F16H 61/16 |
| | | | 701/60 |

FOREIGN PATENT DOCUMENTS

| | | |
|---|---|---|
| JP | 2002-039230 A | 2/2002 |
| JP | 2014-091397 A | 5/2014 |
| JP | 2015-117793 A | 6/2015 |
| JP | 2016-136043 A | 7/2016 |
| JP | 6089601 B2 | 3/2017 |
| JP | 2019-078270 A | 5/2019 |

* cited by examiner

AUTOMATIC TRANSMISSION AND WARMING-UP METHOD FOR AUTOMATIC TRANSMISSION

TECHNICAL FIELD

The present invention relates to an automatic transmission and a warming-up method for an automatic transmission.

BACKGROUND ART

In a transmission in which each part is lubricated using lubricant oil, suitable lubrication may not be performed when the temperature of the lubricant oil is low. Thus, warming-up a transmission is generally performed immediately after activation of a vehicle or the like equipped with a transmission. An example of a warming-up method for the transmission includes, for example, a method of increasing the temperature of the lubricant oil by agitating the lubricant oil with a rotating gear. Another example of the warming-up method for the transmission includes, as disclosed in Patent Literature (hereinafter, referred to as "PTL") 1, a method in which the temperature of the lubricant oil that flows through each part including the transmission is increased by agitation through driving an oil pump.

CITATION LIST

Patent Literature

PTL 1
Japanese Patent Application Laid-Open No. 2014-91397

SUMMARY OF INVENTION

Technical Problem

When a shift position of a transmission is in a neutral position, gears in the transmission generally do not rotate. Due to this, in a case where the warming-up method in which lubricant oil is agitated by a rotating gear is adopted, it is difficult to perform warming-up before starting of a vehicle. Meanwhile, the warming-up can be performed after the starting as the gear rotates, but it takes time to complete the warming-up.

By contrast, in a case where the method disclosed in PTL 1 is adopted, warming-up can be performed even when a shift position is a neutral position, but an oil pump for warming-up is required to be separately installed. Thus, installation space and installation cost of the oil pump are also needed.

An object of the present invention is to provide an automatic transmission and a warming-up method for an automatic transmission each capable of performing warming-up even when a shift position is in a neutral position, and shortening the time until the warming-up is completed.

Solution to Problem

An automatic transmission according to an aspect of the present disclosure includes: a plurality of rotary shafts that includes an input shaft including a clutch and an output shaft for outputting a drive force; a plurality of gears including an output-side gear provided on the output shaft; a plurality of synchromesh mechanisms that includes an output-side synchromesh mechanism capable of coupling between the output shaft and the output-side gear; a lubricant oil reservoir that reserves lubricant oil stirred up by rotation of at least one of the plurality of gears; a shift position detection section that detects which of a plurality of shift positions including a neutral position is selected; and a control section that actuates at least one of the plurality of synchromesh mechanisms other than the output-side synchromesh mechanism for causing the at least one of the plurality of synchromesh mechanisms to couple between at least one of the plurality of rotary shafts other than the output shaft and at least one of the plurality of gears other than the output-side gear, and then puts the clutch into a connected state, when the neutral position is detected by the shift position detection section.

An automatic transmission according to an aspect of the present disclosure includes: a plurality of rotary shafts that includes a first input shaft including a first clutch, a second input shaft including a second clutch, and an output shaft, the second input shaft being provided coaxially with the first input shaft; a plurality of gears; a plurality of synchromesh mechanisms each capable of coupling between at least one of the plurality of rotary shafts and at least one of the plurality of gears; a lubricant oil reservoir that reserves lubricant oil stirred up by rotation of at least one of the plurality of gears; a shift position detection section that detects which of a plurality of shift positions including a neutral position is selected; and a control section that actuates at least one of the plurality of synchromesh mechanisms such that the at least one of the plurality of synchromesh mechanisms forms a drive force transmission path including the first input shaft and the output shaft, and puts the second clutch into a connected state, when a position other than the neutral position is detected by the shift position detection section.

A warming-up method for an automatic transmission according to an aspect of the present disclosure is for the automatic transmission including: for an automatic transmission including: a plurality of rotary shafts that includes an input shaft including a clutch and an output shaft for outputting a drive force; a plurality of gears including an output-side gear provided on the output shaft; a plurality of synchromesh mechanisms that includes an output-side synchromesh mechanism capable of coupling between the output shaft and the output-side gear; and a lubricant oil reservoir that reserves lubricant oil stirred up by rotation of the gear, the warming-up method including: actuating at least one of the plurality of synchromesh mechanisms other than the output-side synchromesh mechanism for causing the at least one of the plurality of synchromesh mechanisms to couple between at least one of the plurality of rotary shafts other than the output shaft and at least one of the plurality of gears other than the output-side gear, and then putting the clutch into a connected state, when the neutral position is detected.

A warming-up method for an automatic transmission according to an aspect of the present disclosure is for the automatic transmission including: a plurality of rotary shafts that includes a first input shaft including a first clutch, a second input shaft including a second clutch, and an output shaft, the second input shaft being provided coaxially with the first input shaft; a plurality of gears; a plurality of synchromesh mechanisms each capable of coupling between at least one of the plurality of rotary shafts and at least one of the plurality of gears; a lubricant oil reservoir that reserves lubricant oil stirred up by rotation of at least one of the plurality of gears, the warming-up method including: actuating at least one of the plurality of synchromesh mechanisms such that the at least one of the plurality of synchromesh mechanisms forms a drive force transmission path including the first input shaft and the output shaft, and putting the second clutch into a connected state, when a position other than the neutral position is detected.

Advantageous Effects of Invention

According to the present disclosure, it is possible to perform warming-up even when a shift position is in a neutral position, and shorten the time until the warming-up is completed.

DESCRIPTION OF EMBODIMENTS

Hereinafter, an embodiment of the present invention will be described in detail with reference to the accompanying drawings. The embodiment described below is an example and does not limit the present invention.

Figure 1:
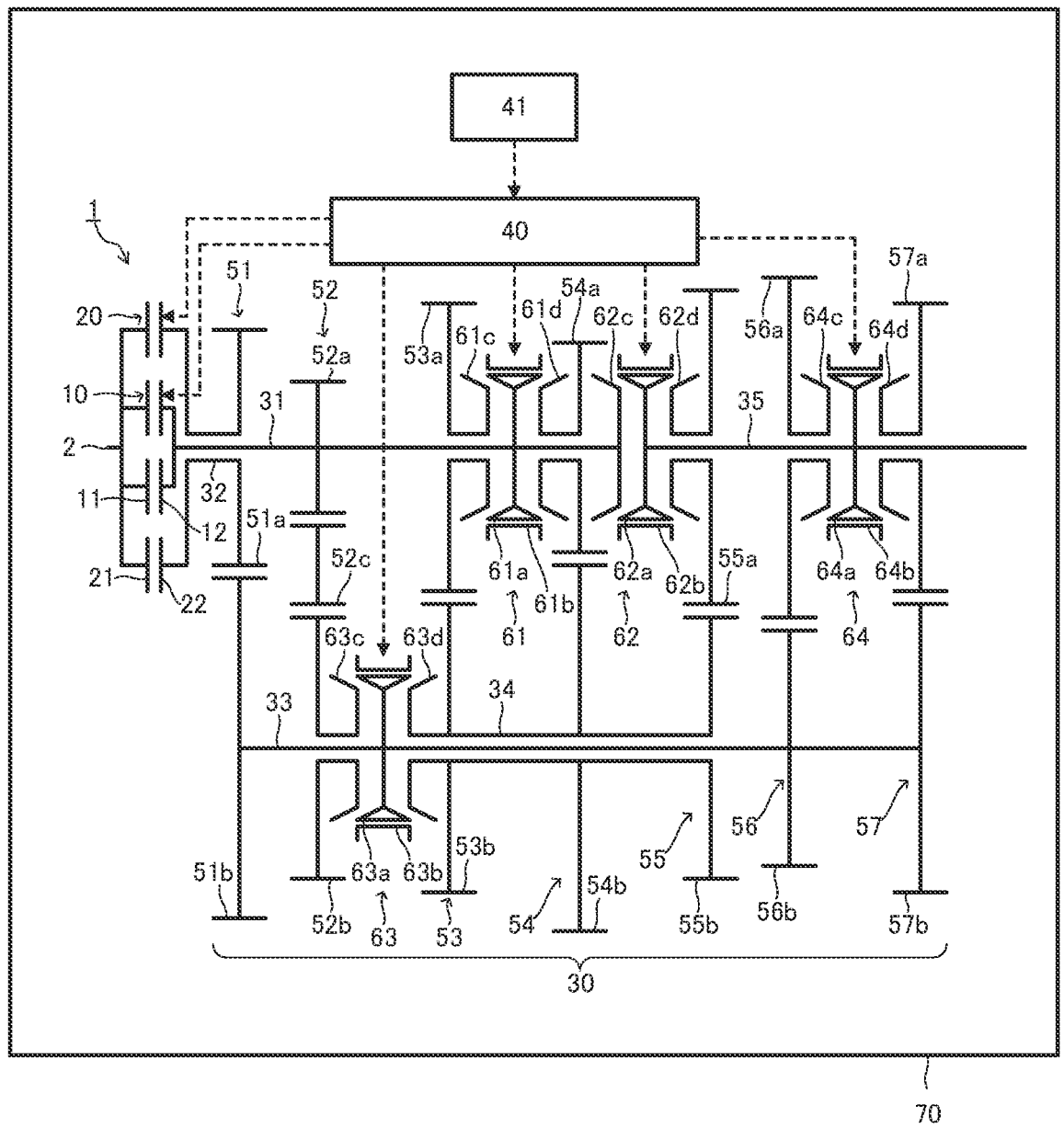
FIG. 1 is a schematic view for describing an overall configuration of an automatic transmission according to an embodiment of the present invention.

First, with reference to FIG. 1, a description will be given of an overall configuration of automatic transmission 1 according to an embodiment of the present invention. As illustrated in FIG. 1, automatic transmission 1 is a dual clutch type transmission. A left side in FIG. 1 is a front side of automatic transmission 1, whereas a right side in FIG. 1 is a rear side of automatic transmission 1. In addition, FIG. 1 is a transparent view seen from a side of automatic transmission 1.

Automatic transmission 1 includes first clutch 10, second clutch 20, and transmission section 30. Automatic transmission 1 is mounted on, for example, a vehicle such as a truck (not illustrated). In addition, drive wheels are coupled, via a propeller shaft, differential and a drive shaft which are not illustrated, to an output-side of transmission section 30 so that power can be transmitted.

First clutch 10 is, for example, a wet multi-plate clutch that is hydraulically actuated and includes a plurality of input-side clutch plates 11 and a plurality of output-side clutch plates 12. Input-side clutch plate 11 rotates integrally with output shaft 2 of a power source (e.g., an engine or a motor, neither is illustrated). Output-side clutch plate 12 rotates integrally with first input shaft 31 of transmission section 30.

First clutch 10 is energized in a disconnection direction by a return spring (not illustrated) and enters a connected state when a control hydraulic pressure is supplied into a hydraulic-oil chamber of a piston (not illustrated) and the piston moves to bring input-side clutch plates 11 and output-side clutch plates 12 into pressure-contact with each other. When first clutch 10 enters the connected state, a drive force of the power source is transmitted to first input shaft 31. Connection and disconnection of first clutch 10 are controlled by control section 40.

Second clutch 20 is provided on an outer circumferential side of first clutch 10. In the present embodiment, a description will be given with an example in which second clutch 20 is provided on an outer circumferential side of first clutch 10; however, an arrangement relationship between first clutch 10 and second clutch 20 is not limited to this arrangement. For example, second clutch 20 may be provided on a front side or a rear side of first clutch 10.

Second clutch 20 for example, a wet multi-plate clutch that is hydraulically actuated and includes a plurality of input-side clutch plates 21 and a plurality of output-side clutch plates 22. Input-side clutch plate 21 rotates integrally with output shaft 2 of the power source. Output-side clutch plate 22 rotates integrally with second input shaft 32 of transmission section 30.

Second clutch 20 is energized in a disconnection direction by a return spring (not illustrated) and enters a connected state when a control hydraulic pressure is supplied into a hydraulic-oil chamber of a piston (not illustrated) and the piston moves to bring input-side clutch plates 21 and output-side clutch plates 22 into pressure-contact with each other. When second clutch 20 enters the connected state, a drive force of the power source is transmitted to second input shaft 32. Connection and disconnection of second clutch 20 are controlled by control section 40.

Transmission section 30 includes first input shaft 31 connected to an output side of first clutch 10 and second input shaft 32 connected to an output side of second clutch 20. Transmission section 30 includes first counter shaft 33 and second counter shaft 34 which are arranged in parallel to first input shaft 31 and second input shaft 32. Transmission section 30 further includes output shaft 35 provided coaxially with first input shaft 31 and second input shaft 32.

First input shaft 31 is pivotably supported by a transmission case (not illustrated) via a bearing (not illustrated). Second input-side gear 52a that functions as a reverse gear is fixed to an intermediate portion in a front-rear direction of first input shaft 31.

First synchronizer hub 61a of first synchromesh mechanism 61 (to be described later) is fixed on a rear stage of second input-side gear 52a of first input shaft 31.

Between second input-side gear 52a and first synchronizer hub 61a, third input-side gear 53a is provided to be relatively rotatable to first input shaft 31.

On a rear stage of first synchronizer hub 61a, fourth input-side gear 54a is provided relatively rotatable to first input shaft 31.

Second input shaft 32 is a hollow shaft into which first input shaft 31 is inserted and is pivotably supported so as to be relatively rotatable by first input shaft 31 via a bearing (not illustrated). First input-side gear 51a is fixed to a rear end portion of second input shaft 32. First input-side gear 51a is provided on the front side of second input gear 52a.

First counter shaft 33 is pivotably supported by the transmission case (not illustrated) via a bearing (not illustrated). First counter gear 51b, third synchronizer hub 63a of third synchromesh mechanism 63 (to be described later), sixth counter gear 56b, and seventh counter gear 57b are fixed to first counter shaft 33 in this order from the front side.

First counter gear 51b is always in mesh with first input-side gear 51a. First input-side gear 51a and first counter gear 51b constitute first gear train 51.

Between first counter gear 51b and third synchromesh mechanism 63, second counter gear 52b is provided to be relatively rotatable to first counter shaft 33. Second counter gear 52b is always in mesh with second input-side gear 52a via reverse idler gear 52c. Second input-side gear 52a, reverse idler gear 52c, and second counter gear 52b constitute reverse gear train 52. Second counter shaft 34 is provided between third synchromesh mechanism 63 and sixth counter gear 56b.

Second counter shaft 34 is a hollow shaft into which first counter shaft 33 is inserted and is pivotably supported so as to be relatively rotatable by first counter shaft 33 via a bearing (not illustrated). Third counter gear 53b is fixed to a front-side portion of second counter shaft 34. Third counter gear 53b is always in mesh with third input-side gear 53a. Third input-side gear 53a and third counter gear 53b constitute second gear train 53.

Fourth counter gear 54b is fixed on a rear stage of third counter gear 53b of second counter shaft 34. Fourth counter gear 54b is always in mesh with fourth input-side gear 54a. Fourth input-side gear 54a and fourth counter gear 54b constitute third gear train 54. Fifth counter gear 55b is fixed to a rear end portion of second counter shaft 34.

Output shaft 35 is pivotably supported by the transmission case (not illustrated) via a bearing (not illustrated). Second synchronizer hub 62a of second synchromesh mechanism 62 (to be described later) is fixed to a front end portion of output shaft 35. Fourth synchronizer hub 64a of fourth synchromesh mechanism 64 (to be described later) is fixed on a rear stage of second synchronizer hub 62a of output shaft 35.

Between second synchronizer hub 62a and fourth synchronizer hub 64a, first output-side gear 55a is provided to be relatively rotatable to output shaft 35. First output-side gear 55a is always in mesh with fifth counter gear 55b. First output-side gear 55a and fifth counter gear 55b constitute fourth gear train 55.

Between first output-side gear 55a and fourth synchronizer hub 64a, second output-side gear 56a is provided to be relatively rotatable to output shaft 35. Second output-side gear 56a is always in mesh with sixth counter gear 56b. Second output-side gear 56a and sixth counter gear 56b constitute fifth gear train 56.

On a rear stage of fourth synchronizer hub 64a, third output-side gear 57a is provided to be relatively rotatable to output shaft 35. Third output-side gear 57a is always in mesh with seventh counter gear 57b. Third output-side gear 57a and seventh counter gear 57b constitute sixth gear train 57.

Transmission section 30 includes first synchromesh mechanism 61, second synchromesh mechanism 62, third synchromesh mechanism 63, and fourth synchromesh mechanism 64.

First synchromesh mechanism 61 includes first synchronizer hub 61a, first synchronizer sleeve 61b, first dog gear 61c, and second dog gear 61d. As described above, first synchronizer hub 61a is fixed to first input shaft 31.

First synchronizer sleeve 61b is provided to surround first synchronizer hub 61a. First synchronizer sleeve 61b has internal spline teeth engaged with external spline teeth of first synchronizer hub 61a. First synchronizer sleeve 61b rotates integrally with first synchronizer hub 61a and is movable with respect to first synchronizer hub 61a in the front-rear direction.

First dog gear 61c is provided on a rear side of third input-side gear 53a. Second dog gear 61d is provided on a front side of fourth input-side gear 54a. Synchronizer rings (not illustrated) are provided one each between first synchronizer hub 61a and first dog gear 61c and between first synchronizer hub 61a and second dog gear 61d. The internal spline teeth of first synchronizer sleeve 61b are selectively engageable with either one of external spline teeth of first dog gear 61c or external spline teeth of second dog gear 61d.

First synchromesh mechanism 61 is configured to synchronously couple first input shaft 31 selectively to third input-side gear 53a or fourth input-side gear 54a in response to first synchronizer sleeve 61b being moved by a shift fork (not illustrated) and engaged with first dog gear 61c or second dog gear 61d. An actuation of first synchromesh mechanism 61 is controlled by control section 40.

Second synchromesh mechanism 62 includes second synchronizer hub 62a, second synchronizer sleeve 62b, third dog gear 62c, and fourth dog gear 62d. As described above, second synchronizer hub 62a is fixed to output shaft 35.

Second synchronizer sleeve 62b is provided to surround second synchronizer hub 62a. Second synchronizer sleeve 62b has internal spline teeth engaged with external spline teeth of second synchronizer hub 62a. Second synchronizer sleeve 62b rotates integrally with second synchronizer hub 62a and is movable with respect to second synchronizer hub 62a in the front-rear direction.

Third dog gear 62c is provided on a rear end portion of first input shaft 31. Fourth dog gear 62d is provided on a front side of first output-side gear 55a. Synchronizer rings (not illustrated) are provided one each between second synchronizer hub 62a and third dog gear 62c and between second synchronizer hub 62a and fourth dog gear 62d. The internal spline teeth of second synchronizer sleeve 62b are selectively engageable with either one of external spline teeth of third dog gear 62c or external spline teeth of fourth dog gear 62d.

Second synchromesh mechanism 62 is configured to synchronously couple output shaft 35 selectively to first input shaft 31 or first input-side gear 55a in response to second synchronizer sleeve 62b being moved by a shift fork (not illustrated) and engaged with third dog gear 62c or fourth dog gear 62d. An actuation of second synchromesh mechanism 62 is controlled by control section 40.

Third synchromesh mechanism 63 includes third synchronizer hub 63a, third synchronizer sleeve 63b, fifth dog gear 63c, and sixth dog gear 63d. As described above, third synchronizer hub 63a is fixed to first countershaft 33.

Third synchronizer sleeve 63b is provided to surround third synchronizer hub 63a. Third synchronizer sleeve 63b has internal spline teeth engaged with external spline teeth of third synchronizer hub 63a. Third synchronizer sleeve 63b rotates integrally with third synchronizer hub 63a and is movable with respect to third synchronizer hub 63a in the front-rear direction.

Fifth dog gear 63c is provided on a rear side of second counter gear 52b. Sixth dog gear 63d is provided on a front end portion of second counter shaft 34. Synchronizer rings (not illustrated) are provided one each between third synchronizer hub 63a and fifth dog gear 63c and between third synchronizer hub 63a and sixth dog gear 63d. The internal spline teeth of third synchronizer sleeve 63b are selectively engageable with either one of external spline teeth of fifth dog gear 63c or external spline teeth of sixth dog gear 63d.

Third synchromesh mechanism 63 is configured to synchronously couple first counter shaft 33 selectively to second counter gear 52b or second counter shaft 34 in response to third synchronizer sleeve 63b being moved by a shift fork (not illustrated) and engaged with fifth dog gear 63c or sixth dog gear 63d. An actuation of third synchromesh mechanism 63 is controlled by control section 40.

Fourth synchromesh mechanism 64 includes fourth synchronizer hub 64a, fourth synchronizer sleeve 64b, seventh dog gear 64c, and eighth dog gear 64d. As described above, fourth synchronizer hub 64a is fixed to output shaft 35.

Fourth synchronizer sleeve 64b is provided to surround fourth synchronizer hub 64a. Fourth synchronizer sleeve 64b has internal spline teeth that engage with the external spline teeth of fourth synchronizer hub 64a. Fourth synchronizer sleeve 64b rotates integrally with fourth synchronizer hub 64a and is movable with respect to fourth synchronizer hub 64a in the front-rear direction.

Seventh dog gear 64c is provided on a rear side of second output-side gear 56a. Eighth dog gear 64d is provided on a front side of third output-side gear 57a. Synchronizer rings (not illustrated) are provided one each between fourth synchronizer hub 64a and seventh dog gear 64c and between fourth synchronizer hub 64a and eighth dog gear 64d. The internal spline teeth of fourth synchronizer sleeve 64b are selectively engageable with either one of external spline teeth of seventh dog gear 64c and external spline teeth of eighth dog gear 64d.

Fourth synchromesh mechanism 64 is configured to synchronously couple output shaft 35 selectively to second output-side gear 56a or third output-side gear 57a in response to fourth synchronizer sleeve 64b being moved by a shift fork (not illustrated) and engaged with seventh dog gear 64c or eighth dog gear 64d. An actuation of fourth synchromesh mechanism 64 is controlled by control section 40.

Shift position detection section 41 detects a shift position selected by an operation of a driver on a shift lever (not illustrated). Shift position detection section 41 is connected to control section 40.

Each configuration of automatic transmission 1 described above is housed in case 70. In a lower portion of case 70, the lubricant oil for lubricating each part of automatic transmission 1 (transmission oil, not illustrated) is stored. The lubricant oil is reserved, for example, from a bottom surface of case 70 to about a height of first counter shaft 33 and second counter shaft 34. When the gears provided on first counter shaft 33 and second counter shaft 34 rotate, the lubricant oil is agitated and stirred up by the gear to lubricate each part. Note that, case 70 is an example of a lubricant oil reservoir of the present invention.

The configuration of automatic transmission 1 according to the present embodiment has been described above. Note that, FIG. 1 is a diagram for describing the configuration of automatic transmission 1, and thus, the respective positions of first synchronizer sleeve 61b, second synchronizer sleeve 62b, third synchronizer sleeve 63b, fourth synchronizer sleeve 64b, which are configured to be movable, are not engaged with any of the dog gears.

First input shaft 31, second input shaft 32, first counter shaft 33, second counter shaft 34, and output shaft 35 described above are examples of a rotary shaft of the present invention; in the following description, these shafts may be collectively referred to as the rotary shaft. Moreover, first input-side gear 51a, second input-side gear 52a, third input-side gear 53a, fourth input-side gear 54a, first counter gear 51b, second counter gear 52b, third counter gear 53b, fourth counter gear 54b, fifth counter gear 55b, sixth counter gear 56b, reverse idler gear 52c, first output-side gear 55a, second output-side gear 56a, and third output-side gear 57a described above are examples of a gear of the present invention; in the following description, these gears may be collectively referred to simply as the gear. Furthermore, first synchromesh mechanism 61, second synchromesh mechanism 62, third synchromesh mechanism 63, and fourth synchromesh mechanism 64 described above are examples of a synchromesh mechanism of the present invention; in the following description, these mechanisms may be collectively referred to simply as the synchromesh mechanism.

Control by Control Section 40

Hereinafter, a control by control section 40 will be described. Control section 40 controls actuation of first clutch 10 or second clutch 20 and actuation of the respective synchromesh mechanisms, and thereby controls a speed shifting operation in automatic transmission 1. More specifically, for example, when actuating first synchromesh mechanism 61, automatic transmission 1 moves first synchronizer sleeve 61b by controlling a hydraulic actuator (not illustrated) that moves the shift fork (not illustrated), and engages first synchronizer sleeve 61b with first dog gear 61c or second dog gear 61d, and thereby causes synchromesh mechanism 61 to synchronously couple first input shaft 31 selectively to third input-side gear 53a or fourth input-side gear 54a. Control section 40 controls a synchromesh mechanism based on a shift position detected by shift position detection section 41 to couple the desired rotary shaft with the desired gear, and thereby switches automatic transmission 1 to the desired speed shifting stage.

Specifically, in a state where the lubricant oil is cold, for example, immediately after activation of a drive source of a vehicle equipped with automatic transmission 1, control section 40 executes a warming-up control for increasing the temperature by agitating the lubricant oil that is reserved in the transmission. Hereinafter, the warming-up control by control section 40 will be described in detail.

Warming-up Control

Figure 2:
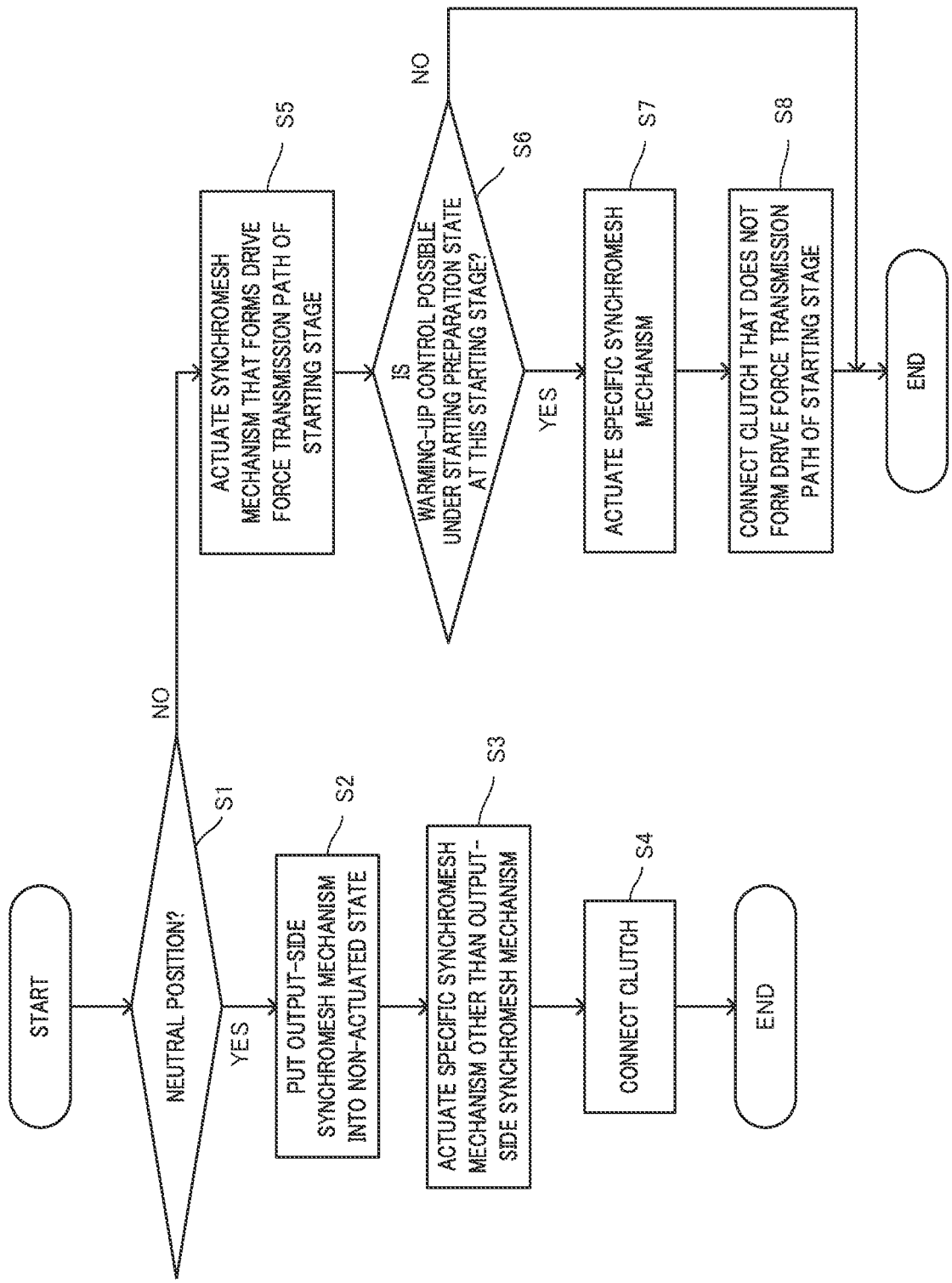
FIG. 2 is a flowchart for describing a warming-up control by a control section.

FIG. 2 is a flowchart for describing a warming-up control executed by control section 40. The warming-up control described in FIG. 2 is assumed to be performed immediately after the activation of the drive source of the vehicle equipped with automatic transmission 1 and before starting of the vehicle. Thus, in the warming-up control described in FIG. 2, the power from the drive source is assumed to be already supplied to output shaft 2 of the drive source.

In step S1, control section 40 determines whether a neutral position of the shift lever is detected by shift position detection section 41. When determining that the neutral position is detected, control section 40 proceeds the processing to step S2, otherwise, proceeds the processing to step S5.

In a case where the shift lever is in the neutral position, control section 40 puts an output-side synchromesh mechanism into a non-actuated state in step S2. The output-side synchromesh mechanism is a synchromesh mechanism that synchronously couples between output shaft 35 and the other rotary shaft or gear; in automatic transmission 1 configured as exemplified in FIG. 1, second synchromesh mechanism 62 and fourth synchromesh mechanism 64 correspond to this. In a state where the output-side synchromesh mechanism is actuated, a vehicle may be started when, for example, any of the clutches is connected in step S4 of a subsequent stage. Since such a situation is undesirable from the viewpoint of safety, the output-side synchromesh mechanism is inactivated in this step S2 in order to prevent this.

In step S3, control section 40 actuates a specific synchromesh mechanism other than the output-side synchromesh mechanism. The specific synchromesh mechanism to be actuated by control section 40 in this step S3 is first synchromesh mechanism 61 and/or third synchromesh mechanism 63. It is desirable to be selectively used as appropriate because a rotational frequency of each gear is different depending on which synchromesh mechanism is actuated. A description will be given in detail later of the warming-up control using first synchromesh mechanism 61 and/or third synchromesh mechanism 63 in the neutral position of the shift lever.

In step S4, control section 40 puts first clutch 10 and/or second clutch 20 into a connected state. This causes the specific gear to begin to rotate under a situation where the drive force is not transmitted to output shaft 35. Thus, the lubricant oil reserved in case 70 is agitated, and the temperature of the lubricant oil is increased; as a result, it is possible to rapidly perform the warming-up of automatic transmission 1.

Hereinafter, specific examples of the warming-up control by control section 40 when the shift lever is in the neutral position will be described.

First Example

Figure 3:
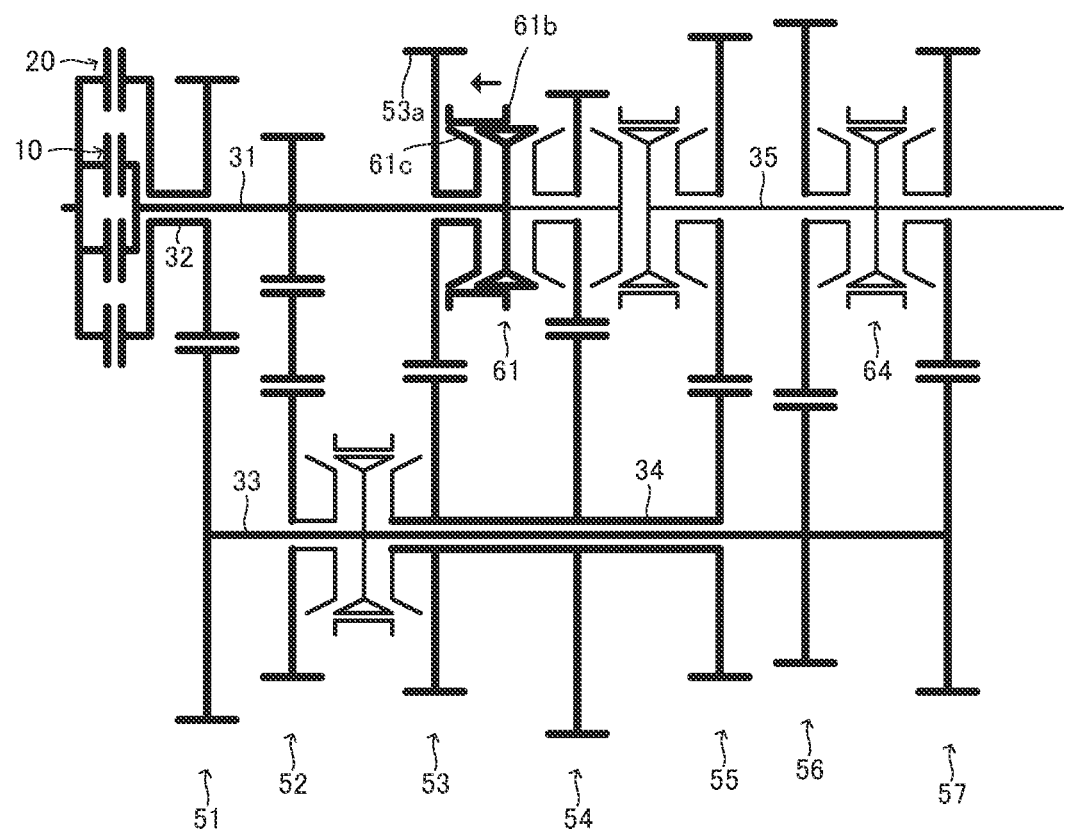
FIG. 3 is a schematic view of an actuated state of a synchromesh mechanism in the first example of the warming-up control by the control section when a shift lever is in a neutral position.

FIG. 3 is a schematic view of an actuated state of a synchromesh mechanism in the first example of the warming-up control by control section 40 when a shift lever is in a neutral position. In the following drawings, a configuration in which the drive force is transmitted is illustrated by a thick solid line.

In the first example illustrated in FIG. 3, first synchromesh mechanism 61 is actuated on the front side by the control of control section 40. More specifically, first synchronizer sleeve 61b is engaged with first dog gear 61c; thereby, the first input shaft and third input-side gear 53a of third gear row 53 are synchronously coupled. In this situation, when control section 40 puts both first clutch 10 and second clutch 20 into a connected state, each part of automatic transmission 1 will be in the following state.

When first input shaft 31 is rotated by the connection of first clutch 10, reverse gear train 52 and third gear train 53 which are connected to first input shaft 31 rotate. The rotation of third gear train 53 causes second counter shaft 34, fourth gear train 54, and fifth gear train 55 to also rotate.

In addition, when second input shaft 32 is rotated by the connection of second clutch 20, first gear train 51 which is connected to second input shaft 32 rotates. The rotation of first gear train 51 causes first counter shaft 33, sixth gear train 56, and seventh gear train 57 to be also rotated.

In the manner described above, in the neutral position of the shift lever, all the gear trains of automatic transmission 1 are rotated by actuating first synchromesh mechanism 61 on the front side under the state in which the output-side synchromesh mechanism is not actuated, and putting first clutch 10 and second clutch 20 into a connected state. Thus, the lubricant oil reserved to about a height of first counter shaft 33 and second counter shaft 34 is agitated and stirred up by the rotation of each gear. As a result, a rapid warming-up is possible.

Second Example

Figure 4:
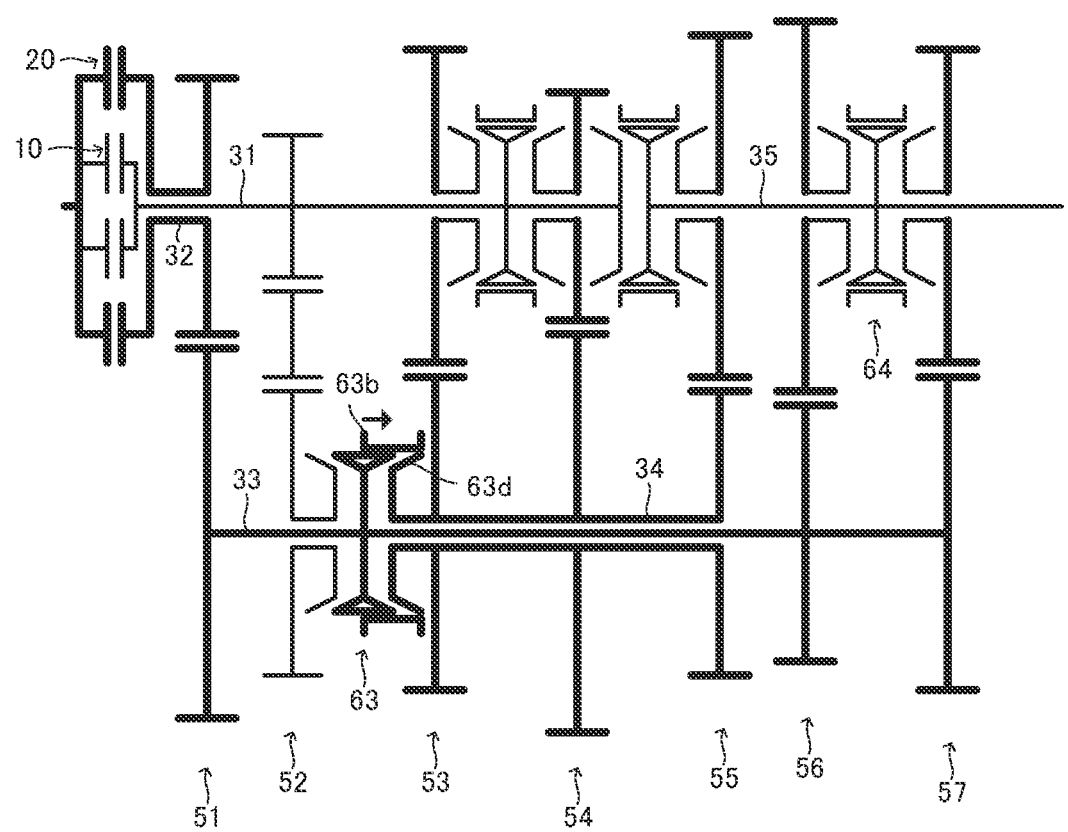
FIG. 4 is a schematic view of an actuation state of a synchromesh mechanism in the second example of the warming-up control by the control section when the shift lever is in the neutral position.

FIG. 4 is a schematic view of an actuation state of a synchromesh mechanism in the second example of the warming-up control by control section 40 when the shift lever is in the neutral position In the second example illustrated in FIG. 4, third synchromesh mechanism 63 is actuated on the rear side by the control of control section 40. More specifically, third synchronizer sleeve 63b is engaged with sixth dog gear 63d; thereby, first counter shaft 33 and second counter shaft 34 are synchronously coupled. In this situation, when control section 40 puts second clutch 20 into a connected state, each part of automatic transmission 1 will be in the following state.

When second input shaft 32 is rotated by the connection of second clutch 20, first gear train 51 which is connected to second input shaft 32 rotates. The rotation of first gear train 51 causes first counter shaft 33, sixth gear train 56 and seventh gear train 57 to also rotate. Furthermore, since first counter shaft 33 and second counter shaft 34 are synchronously coupled by third synchromesh mechanism 63, second counter shaft 34, third gear train 53, fourth gear train 54, and fifth gear train 55 also rotate.

In the manner described above, in the neutral position of the shift lever, all the gear trains of automatic transmission 1 are rotated excluding reverse gear train 52 by actuating third synchromesh mechanism 63 on the rear side under the situation in which the output-side synchromesh mechanism is not actuated, and putting second clutch 20 into a connected state. Thus, even in the second example, the lubricant oil reserved to about a height of first counter shaft 33 and second counter shaft 34 is agitated and stirred up by the rotation of each gear. As a result, a rapid warming-up is possible.

Third Example

Figure 5:
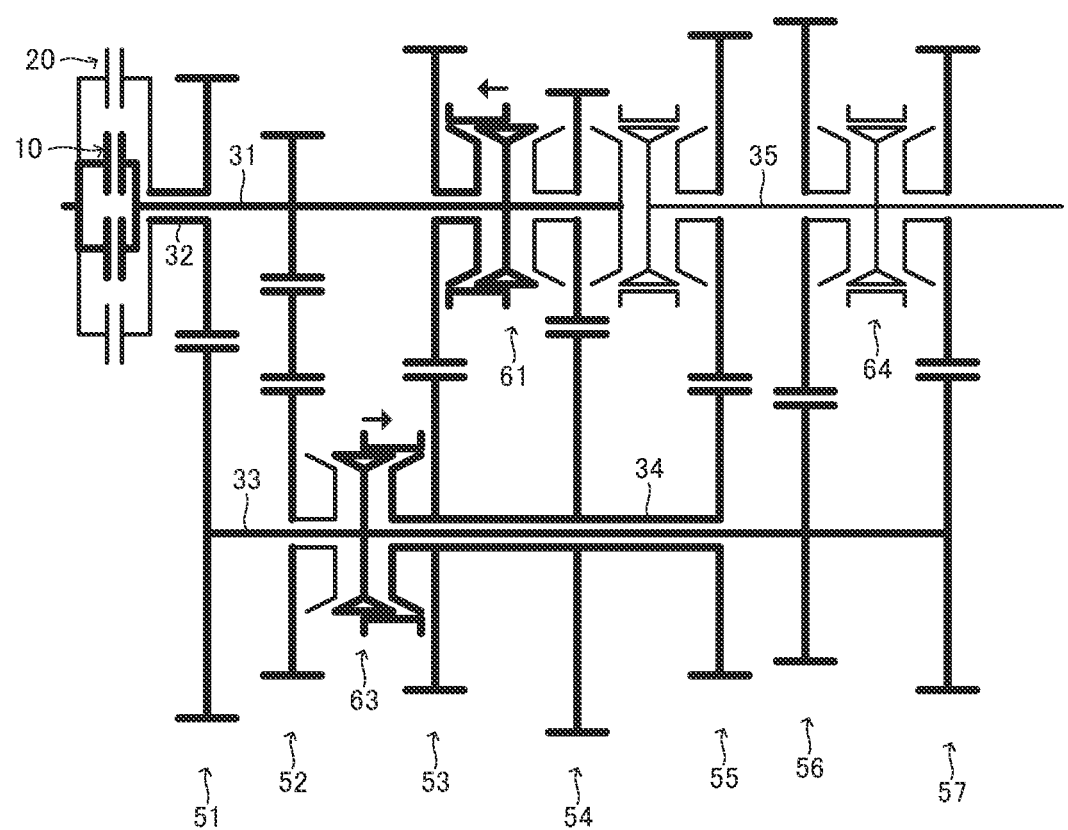
FIG. 5 is a schematic view of an actuation state of a synchromesh mechanism in the third example of the warming-up control by the control section when the shift lever is in the neutral position.

FIG. 5 is a schematic view of an actuation state of a synchromesh mechanism in the third example of the warming-up control by control section 40 when the shift lever is in the neutral position.

In the third example illustrated in FIG. 5, first synchromesh mechanism 61 is actuated on the front side, while third synchromesh mechanism 63 is actuated on the rear side, respectively by the control of control section 40. In this situation, when control section 40 puts first clutch 10 into a connected state, each part of automatic transmission 1 will be in the following state.

When first input shaft 31 is rotated by the connection of first clutch 10, reverse gear train 52 and third gear train 53 which are connected to first input shaft 31 rotate. The rotation of third gear train 53 causes second counter shaft 34, fourth gear train 54, and fifth gear train 55 to also rotate. Furthermore, since first counter shaft 33 and the second counter shaft are synchronously coupled by third synchromesh mechanism 63, first counter shaft 33, first gear train 51, sixth gear train 56, and seventh gear train 57 also rotate.

In the manner described above, in the neutral position of the shift lever, all the gear trains of automatic transmission 1 are rotated by actuating first synchromesh mechanism 61 on the front side and third synchromesh mechanism 63 on the rear side under the situation in which the output-side synchromesh mechanism is not actuated, and putting first clutch 10 into a connected state.

In the third example, as described above, third gear train 53 is interposed in the rotations of first counter shaft 33 as well as sixth gear train 56 and seventh gear train 57 that rotate at the same rotational frequency as first counter shaft 33. Thus, the rotational frequency of first counter shaft 33, sixth gear train 56, and seventh gear train 57 becomes larger than the normal rotational frequency by the amount corresponding to the interposition of third gear train 53. Note that, the term "normal" used in the third example refers to the case where first counter shaft 33, sixth gear train 56, and seventh gear train 57 are rotated by the connection of the second clutch.

Thus, in the third example, as compared with the first example mentioned above, even when the rotational frequency of the drive force is the same, it is possible to rotate some of the gears faster. As a result, it is possible to perform warming-up more rapidly.

Fourth Example

Figure 6:
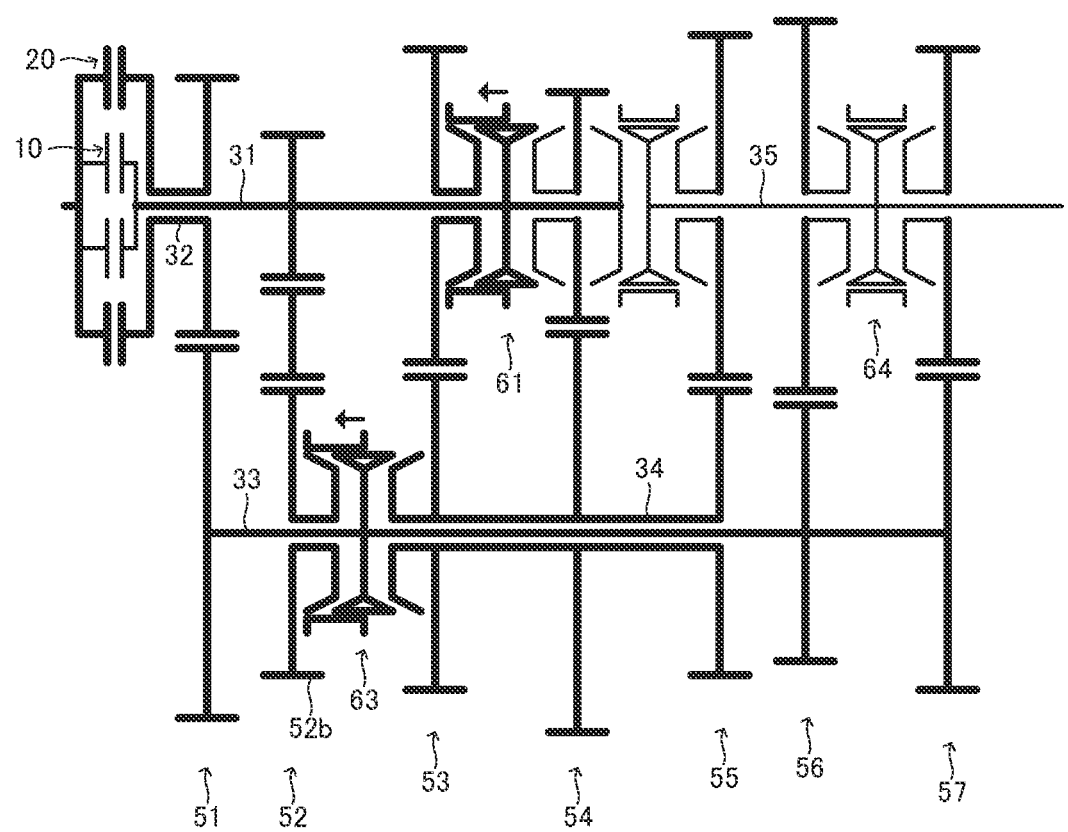
FIG. 6 is a schematic view of an actuation state of a synchromesh mechanism in the fourth example of the warming-up control by the control section when the shift lever is in the neutral position.

FIG. 6 is a schematic view of an actuation state of a synchromesh mechanism in the fourth example of the warming-up control by control section 40 when the shift lever is in the neutral position In the fourth example illustrated in FIG. 6, both of first synchromesh mechanism 61 and third synchromesh mechanism 63 are actuated on the front side by the control of control section 40. In this situation, when control section 40 puts second clutch 20 into a connected state, each part of automatic transmission 1 will be in the following state.

When second input shaft 32 is rotated by the connection of second clutch 20, first gear train 51 which is connected to second input shaft 32 rotates. The rotation of first gear train 51 causes first counter shaft 33, sixth gear train 56 and seventh gear train 57 to also rotate. Furthermore, since first counter shaft 33 and second counter gear 52b of reverse gear train 52 are synchronously coupled by third synchromesh mechanism 63, reverse gear train 52 thus also rotates.

Consequently, first input shaft 31 is rotated backward to the normal via reverse gear train 52. Since first input shaft 31 and third gear train 53 are synchronously coupled by first synchronous mechanism 61; thus, third gear train 53, second counter shaft 34, fourth gear train 54, and fifth gear train 55 also rotate backward to the normal. Note that, the term "normal" in the fourth example refers to the case where first input shaft 31, third gear train 53, second counter shaft 34, fourth gear train 54, and fifth gear train 55 are rotated by the connection of first clutch 10.

In the manner described above, in the neutral position of the shift lever, all the gear trains of automatic transmission 1 are rotated by actuating both of first synchromesh mechanism 61 and third synchromesh mechanism 63 on the front side under the situation in which the output-side synchromesh mechanism is not actuated, and putting second clutch 20 into a connected state.

In the fourth example, as described above, reverse gear train 52 is interposed in the rotation of first input shaft 31, third gear train 53, second counter shaft 34, fourth gear train 54, and fifth gear train 55. Thus, first input shaft 31, third gear train 53, second counter shaft 34, fourth gear train 54, and fifth gear train 55 rotate backward to the normal while the rotational frequency thereof is larger than the normal because reverse gear train 52 is interposed.

On the other hand, in the fourth example, as described above, first gear train 51, first counter shaft 33, sixth gear train 56, and seventh gear train 57 are rotated forward. Thus, in the fourth example, the gears rotating in the opposite directions to each other coexist, and the rotational frequency of some of the gears is faster than that of the other examples described above; thus, it is possible to perform the warming-up more suitably.

Thus, when the shift lever is in the neutral position, control section 40, in the warming-up control, actuates first synchromesh mechanism 61 and/or third synchromesh mechanism 63 under a situation where the output-side synchromesh mechanism is not actuated. This enables each gear to rotate in a situation where the drive force is not transmitted to output shaft 35. As a result, the lubricant oil is agitated, and the temperature of the lubricant oil is increased; thus, it is possible to perform the warming up rapidly before the starting of the vehicle.

Hereinafter, the description returns to the flowchart of FIG. 2. In a case where it is determined that the shift lever is not in the neutral position, that is, the shift lever is put into a drive position by the driver, control section 40, in step S5, appropriately determines the shifting stage (starting stage) to be used when starting the vehicle and actuates the synchromesh mechanism forming the drive force transmission path of the starting stage. Thus, the vehicle is brought into a state to start (starting preparation state) simply by connecting the clutch that forms the drive force transmission path of the starting stage.

Incidentally, the present invention does not limit which shifting stage is used as a starting stage. A starting stage may be determined by control section 40 by using, for example, a method in which the driver optionally selects by the shift lever or an input means (not illustrated), a method of determining one speed shifting stage for starting in advance, or a method in which weight of the vehicle is measured by a sensor (not illustrated) or the like, and the starting stage is determined at the time of starting based on the vehicle weight.

In step S6, control section 40 determines whether a warming-up control under the starting preparation state is possible in the determined starting stage. The determination may be performed based on, for example, a table or the like indicating whether the warming-up control is possible for each starting stage. Such a table may be generated in advance and stored in a memory (not illustrated) or the like. A determination method of whether the warming-up control is possible for each starting stage will be described later.

In step S7, control section 40 actuates a specific synchromesh mechanism. In step S8, control section 40 then connects a clutch that does not form the drive force transmission path of the starting stage.

Incidentally, the specific synchromesh mechanism in step S7, is a synchromesh mechanism which does not affect the drive force transmission circuit of the starting stage even when the clutch that does not form the drive force transmission path of the starting stage is connected in step S8. Such a specific synchromesh mechanism may be described in advance in the table mentioned above.

With such control, when the shift lever is not in the neutral position, the lubricant oil reserved in case 70 is agitated while the starting preparation state is maintained, and thereby the temperature of the lubricant oil is increased. As a result, it is possible to rapidly perform the warming-up of automatic transmission 1.

Hereinafter, a description will be given with specific examples of the determination method of whether the warming-up control is possible for each starting stage in step S6 mentioned above.

Example When Starting Stage is Second Stage

Figure 7:
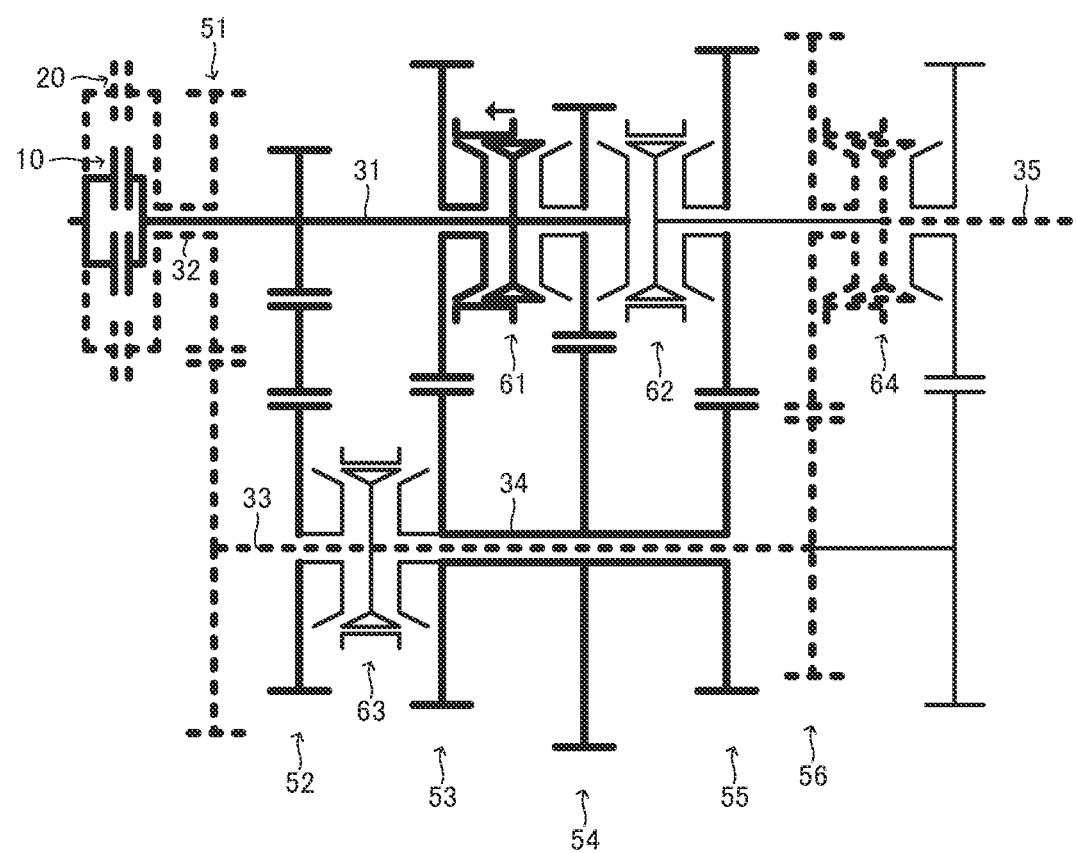
FIG. 7 is a schematic view of an automatic transmission in a starting preparation state when the shift lever is in a drive position while a starting stage is the second speed stage.

FIG. 7 is a schematic view of automatic transmission 1 in a starting preparation state when the shift lever is in a drive position while a starting stage is the second speed stage.

As illustrated in FIG. 7, when the starting stage is the second speed stage, control section 40 actuates fourth synchromesh mechanism 64 on the front side. Thus, the drive force transmission path is formed which passes through in the following order, second clutch 20→second input shaft 32→first gear train 51→first counter shaft 33→fifth gear train 56→fourth synchromesh mechanism 64→output shaft 35. In FIG. 7, the drive force transmission path of the second speed stage is illustrated by a thick dotted line.

In the following, it will be considered whether the warming-up control is possible in such a starting preparation state at the second speed stage.

First, in the starting preparation state at the second speed stage, first synchromesh mechanism 61, second synchromesh mechanism 62, and third synchromesh mechanism 63 are not actuated. Considering the case where any of the synchromesh mechanisms is actuated while maintaining the starting preparation state, the results are as follows.

With respect to first synchromesh mechanism 61, even when actuated on the front side or on the rear side, no interference occurs with the drive force transmission path of the second speed stage.

Meanwhile, with respect to second synchromesh mechanism 62, no interference occurs with output shaft 35 that forms the drive force transmission path of the second speed stage when actuated on the rear side and on the front side. Moreover, with respect to third synchromesh mechanism 63, no interference occurs with first counter shaft 33 that forms the drive force transmission path of the second speed stage when actuated on the rear side and on the front side.

From the above, it is found that first synchromesh mechanism 61 may be actuated under the starting preparation state at the second speed stage. Next, a case will be considered in which first clutch 10 that does not form the drive force transmission path of the second speed stage is connected in a state where first synchronous mechanism 61 is actuated.

In a case where first synchromesh mechanism 61 is actuated while first clutch 10 is put into a connected state in the starting preparation state at the second speed stage, the drive force is transmitted to first input shaft 31, reverse gear train 52, third gear train 53, second counter shaft 34, fourth gear train 54, and fifth gear train 55, as illustrated by a thick solid line in FIG. 7. Even when these are rotated, the drive force transmission path of the second speed stage is not affected. Thus, it is found that, in a starting preparation state of the third speed stage, the warming-up control is possible by putting first clutch 10 into the connected state under a situation where first synchronous mechanism 61 is actuated.

Incidentally, in the example illustrated in FIG. 7, first synchromesh mechanism 61 is actuated on the front side, but the present invention is not limited to this. First synchromesh mechanism 61 may be actuated on the rear side. In this case, first input shaft 31 is connected to fourth gear train 54, and the drive force is transmitted to first input shaft 31, reverse gear train 52, third gear train 53, second counter shaft 34, fourth gear train 54, and fifth gear train 55. Even in this case, the drive force transmission path of the second speed stage is not affected.

Example When Starting Stage is Third Stage

Figure 8:
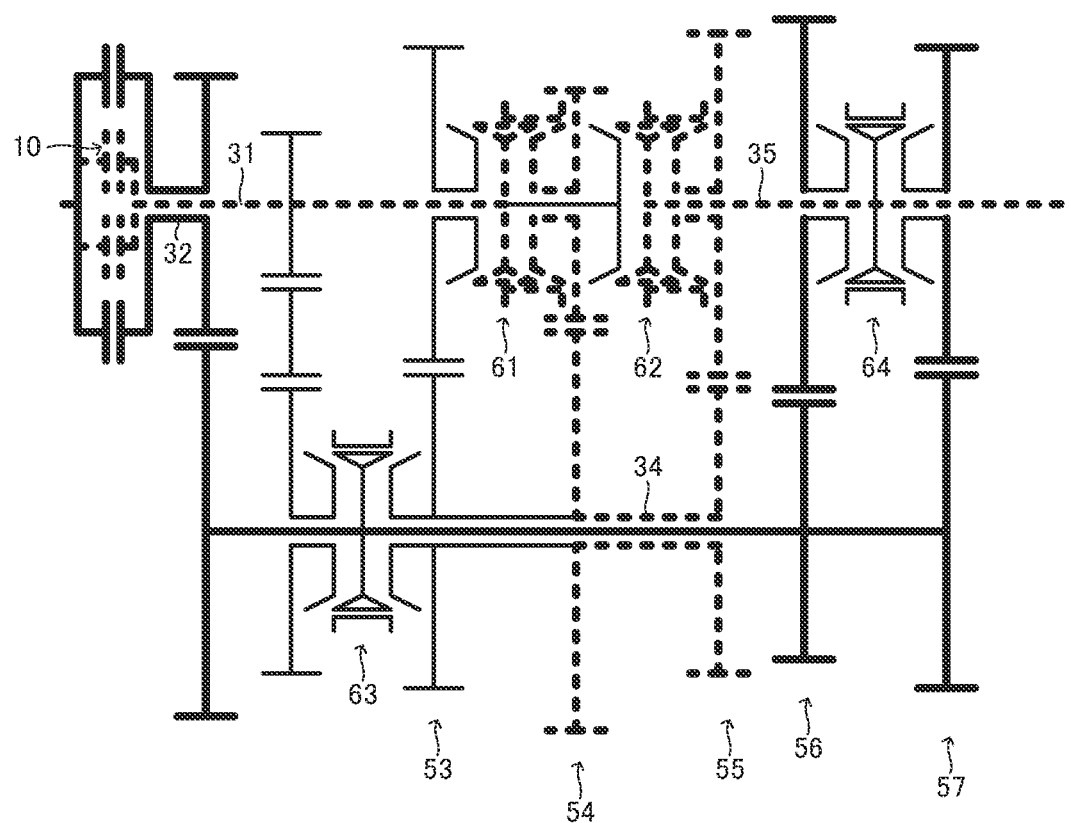
FIG. 8 is a schematic view of an automatic transmission in a starting preparation state when the shift lever is in the drive position while a starting stage is the third speed stage.

FIG. 8 is a schematic view of automatic transmission 1 in a starting preparation state when the shift lever is in the drive position while a starting stage is the third speed stage.

As illustrated in FIG. 8, when the starting stage is the third speed stage, control section 40 actuates first synchromesh mechanism 61 on the rear side while actuating second synchromesh mechanism 62 on the rear side. Thus, the drive force transmission path is formed which passes through in the following order, first clutch 10→first input shaft 31→fourth gear train 54→second counter shaft 34→fifth gear train 55→second synchromesh mechanism 62→output shaft 35. In FIG. 8, the drive force transmission path of the third speed stage is illustrated by a thick dotted line.

In the following, it will be considered whether the warming-up control is possible under the starting preparation state at the third speed stage.

First, in the starting preparation state at the third speed stage, third synchromesh mechanism 63 and fourth synchromesh mechanism 64 are not actuated. Considering the case where any of the synchromesh mechanisms is actuated while maintaining the starting preparation state, the results are as follows.

With respect to third synchromesh mechanism 63, no interference occurs with first input shaft 31 that forms the drive force transmission path of the third speed stage when actuated on the rear side and on the front side. Moreover, with respect to fourth synchromesh mechanism 64, no interference occurs with output shaft 35 that forms the drive force transmission path of the third speed stage when actuated on the rear side and on the front side.

From the above, it is found that in the starting preparation state at the third speed stage, neither of the non-actuated synchromesh mechanisms can be actuated. Next, a case will be considered in which second clutch 20 that does not form the drive force transmission path of the third speed stage is connected in a state where neither of the non-actuated synchronous mechanisms is actuated.

In a case where second clutch 20 is put into the connected state in the starting preparation state at the third speed stage, the drive force is transmitted to second input shaft 32, first gear train 51, first counter shaft 33, sixth gear train 56, and seventh gear train 57, as illustrated by a thick solid line in FIG. 8. Even when these are rotated, the drive force transmission path of the second speed stage is not affected. Thus, in a starting preparation state of the third speed stage, it is found that the warming-up control is possible by putting the second clutch into the connected state without actuating either of the non-actuated synchromesh mechanisms.

Example When Starting Stage is First Stage

Figure 9:
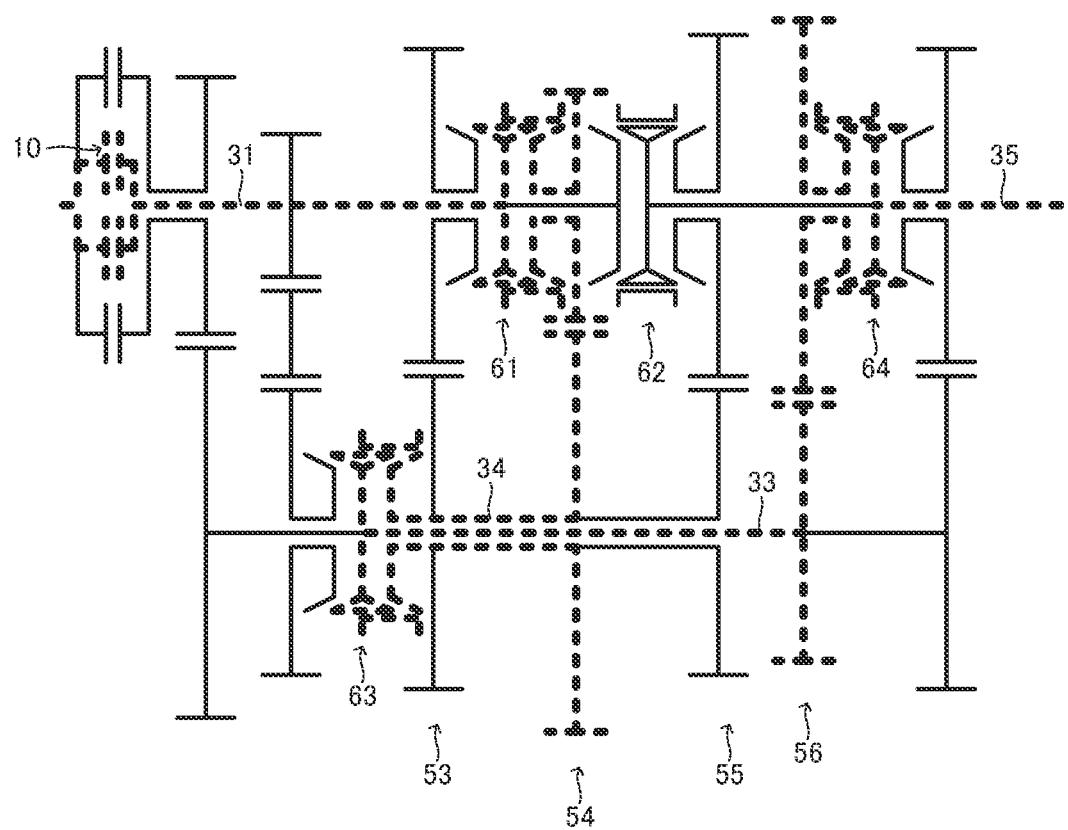
FIG. 9 is a schematic view of an automatic transmission in a starting preparation state when the shift lever is in the drive position while a starting stage is the first speed stage.

FIG. 9 is a schematic view of automatic transmission 1 in a starting preparation state when the shift lever is in the drive position while a starting stage is the first speed stage.

As illustrated in FIG. 9, when the starting stage is the first speed stage, control section 40 actuates first synchromesh mechanism 61 on the rear side, actuates third synchromesh mechanism 63 on the rear side, and actuates fourth synchromesh mechanism 64 on the front side. Thus, the drive force transmission path is formed which passes through in the following order; first clutch 10→first input shaft 31→fourth gear train 54→second counter shaft 34→third synchromesh mechanism 63→first counter shaft 33→sixth gear train 56→fourth synchromesh mechanism 64→output shaft 35. In FIG. 9, the drive force transmission path of the first speed stage is illustrated by a thick dotted line.

In the following, it will be considered whether the warming-up control is possible under the starting preparation state at the first speed stage.

First, in the starting preparation state at the first speed stage, only second synchromesh mechanism 62 is not actuated. Considering the case where the second synchromesh mechanism is actuated while maintaining the starting preparation state, the results are as follows.

When second synchronizing mechanism 63 is actuated on the front side or rear side, no interference occurs with output shaft 35 that forms the drive force transmission path of the first speed stage. Consequently, it is found that, in the starting preparation state at the first speed stage, second synchromesh mechanism 62 which is a non-actuated synchromesh mechanism cannot be actuated. Next, a case will be considered in which second clutch 20 that does not form the drive force transmission path of the first speed stage is connected in a state where second synchromesh mechanism 62 is not actuated.

As illustrated in FIG. 9, when second clutch 20 is attempted to be put into the connected state in the starting preparation state at the first speed stage, no interference occurs with first counter shaft 33 that forms the drive force transmission path of the first speed stage. Thus, it is found that the warming-up control itself cannot be executed in the starting preparation state of the first speed stage.

In the manner described above, whether the warming-up control is possible is determined in the starting preparation state of all shifting stages that may be a starting stage, and, in a case where the warming-up control is possible, the specific synchromesh mechanism to be actuated is determined in advance. A determination result, as described above, is stored in a memory or the like in a table format, and is read and used by control section 40. Such control enables performing the warming-up suitably even in the starting preparation state of the vehicle.

Operational Effect

Automatic transmission 1 according to an embodiment of the present invention includes: a plurality of rotary shafts that includes an input shaft (first input shaft 31 and/or second input shaft 32) including a clutch (first clutch 10 and/or second clutch 20) and output shaft 35 for outputting a drive force; a plurality of gears including an output-side gear (first output-side gear 55a, second output-side gear 56a, and/or third output-side gear 57a) provided on output shaft 35; a plurality of synchromesh mechanisms that includes an output-side synchromesh mechanism (second synchromesh mechanism 62 and/or fourth synchromesh mechanism 64) capable of coupling between output shaft 35 and the output-side gear; case 70 (lubricant oil reservoir) that reserves lubricant oil stirred up by rotation of at least one of the plurality of gears; shift position detection section 41 that detects which of a plurality of shift positions including a neutral position is selected; and control section 40 that actuates at least one of the plurality of synchromesh mechanisms other than the output-side synchromesh mechanism for causing the at least one of the plurality of synchromesh mechanisms to couple between at least one of the plurality of rotary shafts other than the output shaft and at least one of the plurality of gears other than the output-side gear, and then puts the clutch into a connected state, when the neutral position is detected by shift position detection section 41.

With such a configuration, when a shift lever is in a neutral position, it is possible to rotate each gear immediately after activation of a vehicle equipped with automatic transmission 1 in a state where the drive force is not transmitted to output shaft 35. As a result, the lubricant oil is agitated, and the temperature of the lubricant oil is increased; thus, it is possible to perform the warming up rapidly before the starting of the vehicle.

Furthermore, automatic transmission 1 according to the embodiment of the present invention includes: a plurality of rotary shafts that includes first input shaft 31 including first clutch 10, second input shaft 32 including second clutch 20 and provided coaxially with first input shaft 31, and output shaft 35; a plurality of gears; a plurality of synchromesh mechanisms each capable of coupling between at least one of the plurality of rotary shafts and at least one of the plurality of gears; case 70 that reserves lubricant oil stirred up by rotation of at least one of the plurality of gears; shift position detection section 41 that detects which of a plurality of shift positions including a neutral position is selected; and control section 40 that actuates at least one of the plurality of synchromesh mechanisms such that the at least one of the plurality of synchromesh mechanisms forms a drive force transmission path including one input shaft and output shaft 35, and puts the clutch included in the other input shaft into a connected state, when a position other than the neutral position is detected by shift position detection section 41.

Such control enables performing warming-up suitably in a starting preparation state of a vehicle.

Variation

Hereinabove, various embodiments have been described with reference to the drawings, the present disclosure is not limited to such examples. It will be apparent to those skilled in the art may arrive at various modifications or variations at within the scope of the claims, and it is naturally understood that they are also within the technical scope of the present disclosure. In addition, the components in the above embodiments may be optionally combined without departing from the spirit and scope of the disclosure.

In the above-mentioned embodiment, as illustrated in, for example, FIG. 1, a description has been given of automatic transmission 1 including two clutches, seven gear trains, two input shafts, two counter shafts and one output shaft, but the automatic transmission of the present invention is not limited to such a configuration. The number of clutches, gear trains, and rotary shafts may be changed as appropriate.

Moreover, in the above-described embodiment, the warming-up control for automatic transmission 1 is assumed to be performed before starting of the vehicle equipped with automatic transmission 1, but the present invention is not limited to this. For example, the warming-up control in the starting preparation state illustrated in steps S5 to S8 in FIG. 2 can be executed as necessary even after the vehicle starts traveling (during traveling).

Furthermore, in the above-described embodiment, a shift lever is assumed to be in the drive position when the shift lever is not in the neutral position, but the present invention is not limited to this. For example, even when the shift lever is in a reverse position, the warming-up control can be executed, which is similar to that executed when the shift lever is in the drive position.

This application is based upon Japanese Patent Application No. 2019-057117, filed on Mar. 25, 2019, the entire contents of which are incorporated herein by reference.

INDUSTRIAL APPLICABILITY

The present invention can provide an automatic transmission capable of performing a rapid warming-up.

REFERENCE SIGNS LIST

1 Automatic transmission
2 Drive source output shaft
10 First clutch
11 Input-side clutch plate
12 Output-side clutch plate
20 Second clutch
21 Input-side clutch plate
22 Output-side clutch plate
30 Transmission section
31 First input shaft
32 Second input shaft
33 First counter shaft
34 Second counter shaft
35 Output shaft
40 Control section
41 Shift position detection section
51 First gear train
51a First input-side gear
51b First counter gear
52 Reverse gear train
52a Second input-side gear
52b Second counter gear
52c Reverse idler gear
53 Second gear train
53a Third input-side gear
53b Third counter gear
54 Third gear train
54a Fourth input-side gear
54b Fourth counter gear
55 Fourth gear train
55a First output-side gear
55b Fifth counter gear
56 Fifth gear train
56a Second output-side gear
56b Sixth counter gear
57 Sixth gear train
57a Third output-side gear
57b Seventh counter gear
61 First synchromesh mechanism
61a First synchronizer hub
61b First synchronizer sleeve
61c First dog gear
61d Second dog gear
62 Second synchromesh mechanism
62a Second synchronizer hub
62b Second synchronizer sleeve
62c Third dog gear
62d Fourth dog gear
63 Third synchromesh mechanism
63a Third synchronizer hub
63b Third synchronizer sleeve
63c Fifth dog gear
63d Sixth dog gear
64 Fourth synchromesh mechanism
64a Fourth synchronizer hub
64b Fourth synchronizer sleeve
64c Seventh dog gear
64d Eighth dog gear
70 Case

What is claimed is:

1. An automatic transmission, comprising:
a plurality of rotary shafts that includes an input shaft including a clutch and an output shaft for outputting a drive force;
a plurality of gears including an output-side gear provided on the output shaft;
a plurality of synchromesh mechanisms that includes an output-side synchromesh mechanism capable of coupling between the output shaft and the output-side gear;
a lubricant oil reservoir that reserves lubricant oil stirred up by rotation of at least one of the plurality of gears;
a shift position detection section that detects which of a plurality of shift positions including a neutral position is selected; and
a control section that actuates at least one of the plurality of synchromesh mechanisms other than the output-side synchromesh mechanism for causing the at least one of the plurality of synchromesh mechanisms to couple between at least one of the plurality of rotary shafts other than the output shaft and at least one of the plurality of gears other than the output-side gear, and then puts the clutch into a connected state, when the neutral position is detected by the shift position detection section.

2. The automatic transmission according to claim 1, wherein:
the input shaft includes a first input shaft including a first clutch and a second input shaft including a second clutch, the second input shaft being provided coaxially with the first input shaft, and
the control section puts the first clutch and/or the second clutch into a connected state when the neutral position is detected by the shift position detection section.

3. The automatic transmission according to claim 1, wherein
the plurality of rotary shafts includes a first input shaft including a first clutch, a second input shaft including a second clutch, and the output shaft, the second input shaft being provided coaxially with the first input shaft,
the control section actuates at least one of the plurality of synchromesh mechanisms such that the at least one of the plurality of synchromesh mechanisms forms a drive force transmission path including the first input shaft and the output shaft, and puts the second clutch into a connected state, when a position other than the neutral position is detected by the shift position detection section.

4. The automatic transmission according to claim 3, wherein:
the control section puts the second clutch into the connected state after actuating at least one of the plurality of synchromesh mechanisms that does not interfere with the drive force transmission path upon connecting the second clutch.

5. A warming-up method for an automatic transmission including: a plurality of rotary shafts that includes an input shaft including a clutch and an output shaft for outputting a drive force; a plurality of gears including an output-side gear provided on the output shaft; a plurality of synchromesh mechanisms that includes an output-side synchromesh mechanism capable of coupling between the output shaft and the output-side gear; and a lubricant oil reservoir that reserves lubricant oil stirred up by rotation of at least one of the plurality of gears, the warming-up method comprising:

actuating at least one of the plurality of synchromesh mechanisms other than the output-side synchromesh mechanism for causing the at least one of the plurality of synchromesh mechanisms to couple between at least one of the plurality of rotary shafts other than the output shaft and the at least one of the plurality of gears other than the output-side gear, and then putting the clutch into a connected state, when a neutral position included in a plurality of shift positions is detected.

6. The warming-up method for the automatic transmission according to claim 5, wherein the plurality of rotary shafts includes a first input shaft including a first clutch, a second input shaft including a second clutch, and the output shaft, the second input shaft being provided coaxially with the first input shaft, the warming-up method comprising:

actuating at least one of the plurality of synchromesh mechanisms such that the at least one of the plurality of synchromesh mechanisms forms a drive force transmission path including the first input shaft and the output shaft, and putting the second clutch into a connected state, when a position other than the neutral position is detected.

* * * * *